Figure 1:
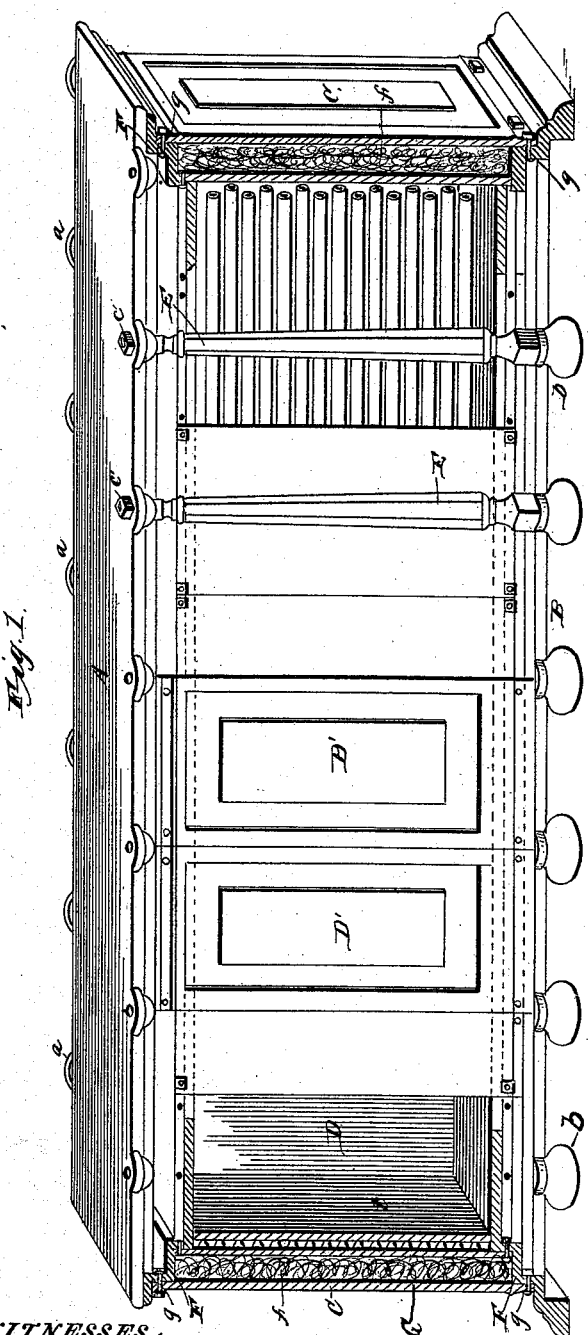

(No Model.) 2 Sheets—Sheet 1.

V. W. BLANCHARD.
STEAM BOILER CASING.

No. 413,919. Patented Oct. 29, 1889.

WITNESSES
Walter H. Pumphrey.
A. E. Dowell.

INVENTOR
Virgil W. Blanchard
by
T. A. Alexander
Attorney

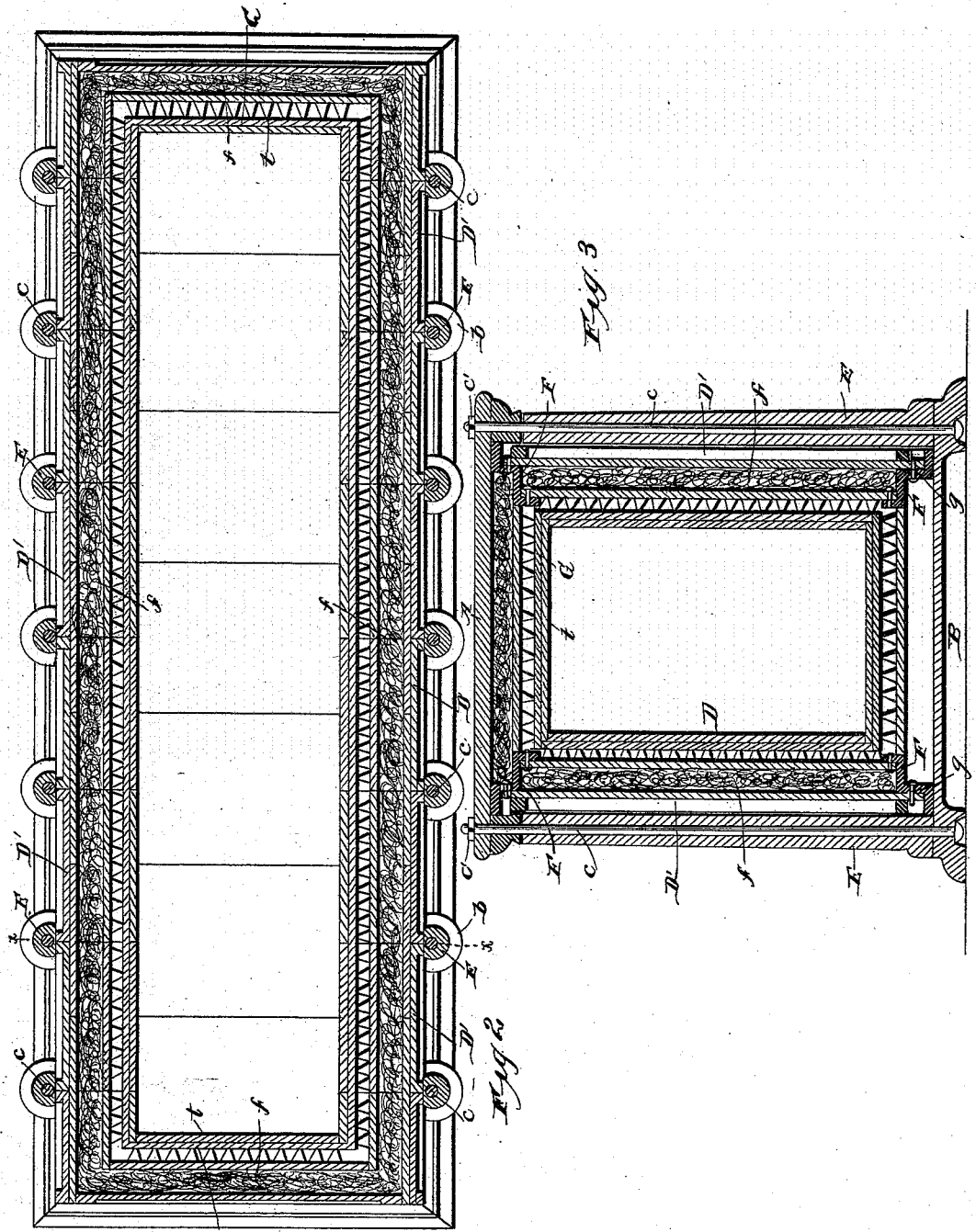

UNITED STATES PATENT OFFICE.

VIRGIL W. BLANCHARD, OF NEW YORK, N. Y., ASSIGNOR TO JOSEPH A. DAVIS, OF SAME PLACE.

STEAM-BOILER CASING.

SPECIFICATION forming part of Letters Patent No. 413,919, dated October 29, 1889.

Application filed April 12, 1889. Serial No. 306,975. (No model.)

*To all whom it may concern:*

Be it known that I, VIRGIL W. BLANCHARD, of New York, in the county of New York and State of New York, have invented certain new and useful Improvements in Boiler-Casings; and I do hereby declare that the following is a full, clear, and exact description thereof, reference being had to the accompanying drawings, and to the letters of reference marked thereon, which form part of this specification, in which—

Figure 1 is a perspective view of my improved casing for steam-boilers, partly in section. Fig. 2 is a horizontal longitudinal section of the casing. Fig. 3 is a vertical section on line $x,x$, Fig. 2.

The object of this invention is to inclose a tubular or other steam-boiler or furnace in a casing the walls of which are practically non-conductors of heat, and so construct the casing of sections and panels that its interior is easily accessible, as will be clearly understood from the following description and claims.

In the drawings is shown a rectangular casing having a top slab A, a base B, end walls C, a back wall D, and a front wall composed of removable panels D'. The top slab A is cast with offsets or lugs $a$, which are perforated, and the base B is also cast with similar lugs $b$. Between the lugs $a\ b$ are fitted hollow pillars E, through which are passed from below upward bolts $c$, which are secured by nuts $c'$ on their upper ends. These bolts and nuts are ties, and pillars E are adapted to break joints with the joints of panels D'.

F designates angle-irons presenting two right angles, which I use to bind the several sides composing my casing securely together by the aid of through-bolts $g$.

The walls proper of the casing are constructed as follows: G designates a cast-metal wall constructed with numerous studs on its inner face, covered with layers of asbestus paper, with an intermediate layer of wire-gauze and a sheet-iron plate $t$. The upper and lower edge of this non-conducting wall G are tightly and rigidly secured to the lower vertical portion of the angle-iron F. Between wall G and outer wall E is a space $f$, which is closely packed with mineral wool or other refractory substance. The outer wall D' is riveted to the upper vertical portions of the angle-irons F. I thus have a casing composed of non-conducting walls, and the side walls thereof are composed of removable panels that are secured in their respective places by means of screws $e$ and by means of pillars E and bolts $c$.

By removing bolts $c$, the pillars, and the screws $e$, the panels D' can be removed by hand and access had to the interior of the casing.

Having thus described my invention, I claim—

1. A casing consisting of non-conducting walls composed of sections secured together by hollow pillars and stay-bolts, substantially as and for the purpose specified.

2. A casing the walls of which are respectively composed of a studded plate covered interiorly with a poor conductor of heat, an external wall, and an intermediate space filled with refractory material, substantially as specified.

3. A casing consisting of a top wall A, a base B, and walls C', and side walls formed of removable panels which are non-conductors of heat, secured together substantially in the manner and for the purpose specified.

4. The herein-described casing, consisting of a non-conducting top having lugs $a$ on it, a non-conducting base, also having lugs on it, non-conducting end walls, angle-irons F, hollow pillars, tie-bolts, and removable panels, all constructed and arranged substantially in the manner and for the purpose specified.

In testimony that I claim the foregoing as my own I affix my signature in presence of two witnesses.

VIRGIL W. BLANCHARD.

Witnesses:
 ALEX. S. STEUART,
 P. L. BROOKS.